United States Patent
Lin et al.

(10) Patent No.: US 11,767,844 B2
(45) Date of Patent: Sep. 26, 2023

(54) FIXED SCROLL DISK AND SCROLL COMPRESSOR HAVING THE SAME

(71) Applicant: Danfoss (Tianjin) Ltd., Tianjin (CN)

(72) Inventors: Jiangbo Lin, Tianjin (CN); Xiaokun Ji, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 0 days.

(21) Appl. No.: 17/461,276

(22) Filed: Aug. 30, 2021

(65) Prior Publication Data
US 2022/0065245 A1    Mar. 3, 2022

(30) Foreign Application Priority Data

Aug. 31, 2020   (CN) .................. 202010901176.X
Aug. 31, 2020   (CN) .................. 202021863545.2

(51) Int. Cl.
| | | |
|---|---|---|
| *F04C 18/02* | (2006.01) | |
| *B33Y 80/00* | (2015.01) | |
| *F04C 2/02* | (2006.01) | |
| *F04C 29/12* | (2006.01) | |

(52) U.S. Cl.
CPC ......... *F04C 18/0253* (2013.01); *B33Y 80/00* (2014.12); *F04C 18/0246* (2013.01); *F04C 18/0261* (2013.01); *F04C 2/025* (2013.01); *F04C 18/0215* (2013.01); *F04C 29/12* (2013.01); *F04C 2230/10* (2013.01); *F04C 2230/20* (2013.01)

(58) Field of Classification Search
CPC .............. F04C 18/0253; F04C 18/0246; F04C 18/0261; F04C 2/025; F04C 18/0215; F04C 29/12; F04C 2230/10; F04C 2230/20; B33Y 80/00
See application file for complete search history.

(56) References Cited

U.S. PATENT DOCUMENTS

| | | | | |
|---|---|---|---|---|
| 5,127,809 | A | * | 7/1992 | Amata ................ F04C 18/0253 418/55.6 |
| 9,541,083 | B2 | | 1/2017 | Jang et al. |
| 2013/0276461 | A1 | * | 10/2013 | Propheter-Hinckley ..................... F04D 29/388 416/227 R |

(Continued)

FOREIGN PATENT DOCUMENTS

| | | |
|---|---|---|
| CN | 202250877 U | 5/2012 |
| CN | 202266423 U | 6/2012 |

(Continued)

OTHER PUBLICATIONS

English Machine Translation of CN202250877U (Year: 2012).*
First Examination Report for Indian Patent Application No. 202114034982 dated Jul. 18, 2022.

*Primary Examiner* — Dominick L Plakkoottam
*Assistant Examiner* — Paul W Thiede
(74) *Attorney, Agent, or Firm* — McCormick, Paulding & Huber PLLC

(57) ABSTRACT

The present disclosure discloses a fixed scroll and a scroll compressor with the same. The fixed scroll includes: an end plate; a fixed scroll wrap protruding from one surface of the end plate; and an internal cavity formed in the end plate. By adopting the fixed scroll and the scroll compressor with the fixed scroll according to the embodiment of the present disclosure, a weight of the scroll compressor may be reduced for example.

11 Claims, 7 Drawing Sheets

(56) References Cited

U.S. PATENT DOCUMENTS

| | | | |
|---|---|---|---|
| 2016/0084250 A1* | 3/2016 | Imai | F04C 29/128 |
| | | | 418/55.3 |
| 2017/0184086 A1* | 6/2017 | Scancarello | F04C 18/0215 |
| 2017/0184108 A1 | 6/2017 | Scancarello et al. | |
| 2019/0048874 A1* | 2/2019 | Yamada | F04C 28/20 |

FOREIGN PATENT DOCUMENTS

| | | | | |
|---|---|---|---|---|
| CN | 203500002 U | | 3/2014 | |
| CN | 108050068 A | | 5/2018 | |
| CN | 208619353 U | | 3/2019 | |
| CN | 209195702 U | | 8/2019 | |
| CN | 210599398 U | * | 5/2020 | |
| CN | 106989018 B | | 6/2020 | |
| CN | 210949108 U | | 7/2020 | |
| EP | 2 538 083 B1 | | 7/2019 | |
| GB | 2319066 A | * | 5/1998 | F01C 17/066 |
| WO | 2014/198215 A1 | | 12/2014 | |
| WO | 2015186641 A1 | | 12/2015 | |
| WO | 2018/094891 A1 | | 5/2018 | |

\* cited by examiner

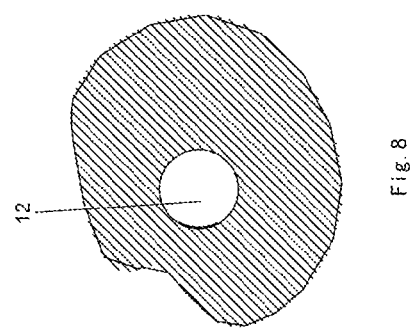
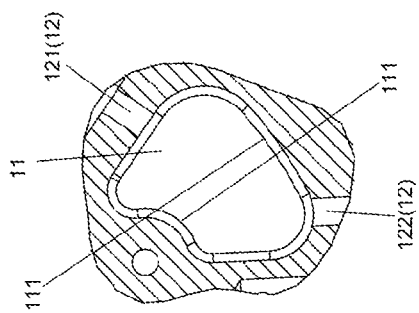

FIXED SCROLL DISK AND SCROLL COMPRESSOR HAVING THE SAME

CROSS-REFERENCE TO RELATED APPLICATION

This application claims foreign priority benefits under 35 U.S.C. § 119 to Chinese Patent Applications No. 202010901176.X and 202021863545.2, both filed on Aug. 31, 2020, the content of each is hereby incorporated by reference in its entirety.

TECHNICAL FIELD

Embodiments of the present disclosure relate to a fixed scroll disk (or "fixed scroll") and a scroll compressor with the same.

BACKGROUND

The scroll compressor includes a fixed scroll and an orbiting scroll, and the fixed scroll and the orbiting scroll may be formed by casting.

SUMMARY

An object of the embodiments of the present disclosure is to provide a fixed scroll and a scroll compressor with the same, thereby, for example, reducing the weight of the scroll compressor.

According to an embodiment of the present disclosure, there is provided a fixed scroll for scroll compressor, comprising: an end plate; a fixed scroll wrap protruding from one surface of the end plate; and an internal cavity formed in the end plate.

According to an embodiment of the present disclosure, the internal cavity comprises two inner walls facing each other in an axial direction of the end plate and two inner walls facing each other in a radial direction of the end plate.

According to an embodiment of the present disclosure, the fixed scroll for scroll compressor further comprises: a discharge hole formed in the end plate and communicating the internal cavity with outside, which is used to discharge material from the internal cavity during a manufacturing process.

According to an embodiment of the present disclosure, the internal cavity comprises a plurality of internal cavities arranged around an axis of the end plate.

According to an embodiment of the present disclosure, the fixed scroll for scroll compressor, further comprises: discharge holes formed in the end plate and communicating the plurality of internal cavities with outside, which are configured to discharge material from the plurality of internal cavities during a manufacturing process; and a port formed in the end plate, wherein the plurality of internal cavities comprise two first internal cavities adjacent to the port and a plurality of second internal cavities between the two first internal cavities in a circumferential direction, and wherein the discharge holes comprise: first communication holes which are located between and communicate the first internal cavity and the second internal cavity adjacent to each other, and which are located between and communicate two adjacent second internal cavities; and a second communication hole which communicates the two first internal cavities with the port.

According to an embodiment of the present disclosure, the port comprises at least one of a suction port and an injection port of the compressor, or one or more dedicated port(s).

According to an embodiment of the present disclosure, in a plane perpendicular to an axial direction of the end plate, each internal cavity has a cross section in a form of circular, elliptical or polygonal.

According to an embodiment of the present disclosure, each discharge hole has a cross section in a form of circular, elliptical or polygonal.

According to an embodiment of the present disclosure, the end plate comprises: a plurality of reinforcing ribs arranged at intervals in a circumferential direction of the end plate; a plurality of first recess portions formed between the plurality of reinforcing ribs; and a plurality of second recess portions respectively formed in the plurality of reinforcing ribs.

According to an embodiment of the present disclosure, the fixed scroll comprises a plurality of the internal cavities arranged around the axis of the end plate, the plurality of internal cavities are respectively opposed to the plurality of the reinforcing ribs in the radial direction of the end plate, and the plurality of first recess portions are respectively opposed to the partition wall between two adjacent inner cavities in the radial direction of the end plate.

According to an embodiment of the present disclosure, the end plate comprises a lug boss provided in the center of the other surface of the end plate, and at least some or all of the internal cavities are formed in the lug boss.

According to an embodiment of the present disclosure, the fixed scroll is formed by 3D printing.

According to an embodiment of the present disclosure, there is provided a scroll compressor, comprising: the fixed scroll mentioned above.

By adopting the fixed scroll and the scroll compressor with the same according to the embodiment of the present disclosure, for example, the weight of the scroll compressor may be reduced.

BRIEF DESCRIPTION OF THE DRAWINGS

FIG. 7 is a schematic enlarged view of part C shown in FIG. 6; and

FIG. 8 is a partially enlarged cross-sectional view taken along the line DD in FIG. 6.

DETAILED DESCRIPTION

Figure 1:
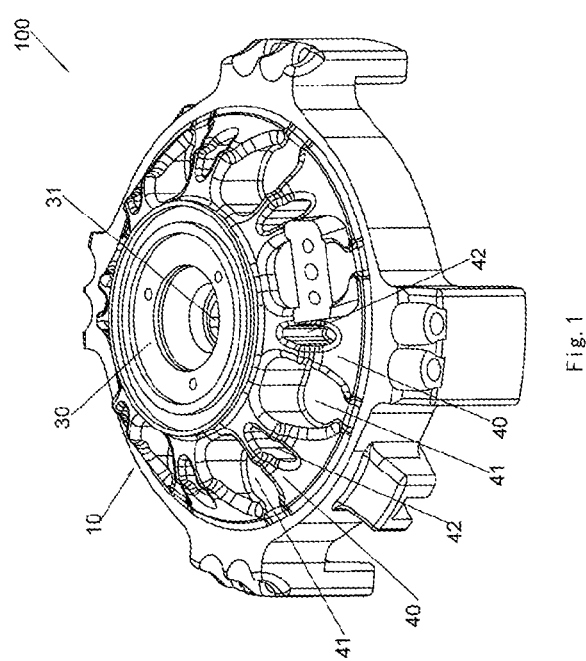
FIG. 1 is a schematic perspective view of a fixed scroll for scroll compressor according to an embodiment of the present disclosure.
Figure 2:
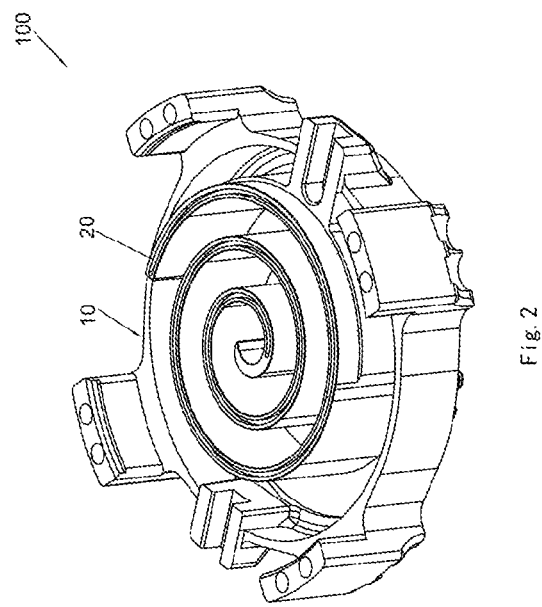
FIG. 2 is another schematic perspective view of a fixed scroll for scroll compressor according to an embodiment of the present disclosure.

The present disclosure will be further described below in conjunction with the drawings and specific embodiments.

Referring to FIGS. 1 to 8, the fixed scroll 100 for scroll compressor according to an embodiment of the present disclosure includes: an end plate 10; a fixed scroll wrap 20 protruding from one surface of the end plate 10; and an internal cavity 11 formed in the end plate 10. The internal cavity 11 has two inner walls 110 facing each other in the axial direction of the end plate 10 (see FIG. 5). The internal cavity 11 also has two inner walls 111 facing each other in the radial direction of the end plate 10 (see FIG. 5, FIG. 6, and FIG. 7). The internal 11 also has two inner walls 112 facing each other in the circumferential direction of the end plate 10 (see FIG. 6). The fixed scroll 100 may be formed by 3D printing, that is, by an additive manufacturing method. The fixed scroll 100 may include a plurality of the internal cavities 11 arranged at intervals around the axis of the end plate 10. Alternatively, the fixed scroll 100 may include an internal cavity 11 arranged around the axis of the end plate 10, that is, when seen from the top view of the fixed scroll, the cross-sectional view of the internal cavity 11 is a ring.

Figure 6:
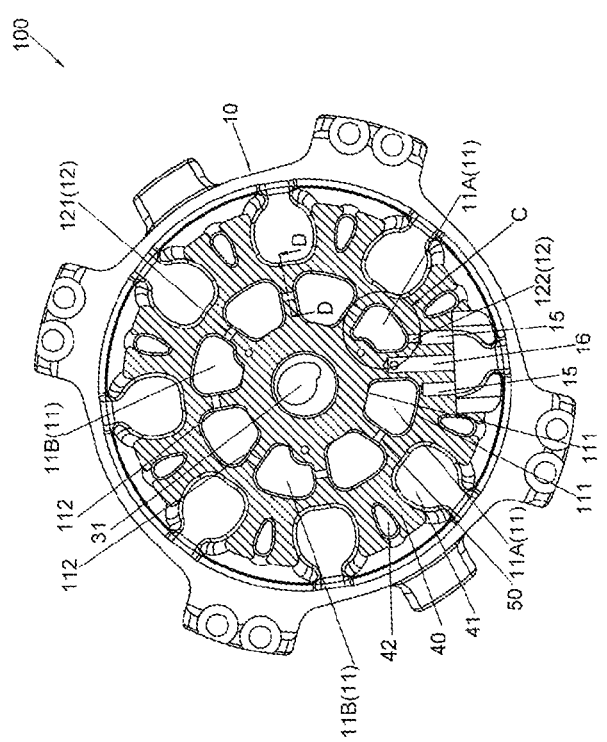
FIG. 6 is a schematic cross-sectional view of the fixed scroll taken along line BB in FIG. 4.

According to an embodiment of the present disclosure, referring to FIGS. 6, 7, and 8, the fixed scroll 100 further includes a discharge hole 12 formed in the end plate 10 and communicating the internal cavity 11 with outside (i.e. an environment external to the fixed scroll 100, as best seen in FIG. 6 via ports 15, 16), which is configured to discharge material, such as excess manufacturing materials, from the internal cavity 11 during the manufacturing process of the fixed scroll.

According to an embodiment of the present disclosure, referring to FIGS. 1 to 8, the fixed scroll 100 further includes: a discharge hole 12 formed in the end plate 10 and communicating the internal cavity 11 with outside (see FIGS. 6, 7), which is configured to discharge excess manufacturing material from the internal cavity 11 during the manufacturing process of the fixed scroll; and ports formed in the end plate 10, the ports may be at least one of the suction port 15 and the injection port 16 of the compressor (see FIG. 6). In addition, the ports may also be one or more port(s) provided separately, that is, one or more dedicated port(s). Referring to FIG. 6, the plurality of internal cavities 11 include: two first internal cavities 11A adjacent to the port and a plurality of second internal cavities 11B between the two first internal cavities 11A in the circumferential direction. The discharge holes 12 include: first communication holes 121 which are located between the first internal cavity 11A and the second internal cavity 11B adjacent to each other and communicate the same, and which are located between two adjacent second internal cavities 11B and communicate the same; and a second communication hole 122 which communicates the two first internal cavities 11A with the port. The excess manufacturing material is discharged from the internal cavity 11 through the ports and the second communication hole 122. Although it is illustrated in FIG. 6 that the second communication hole 122 communicates with the suction port 15, the second communication hole 122 may also communicate with the injection port 16, or communicate with one or more port(s) separately provided at any suitable position(s), as long as excess manufacturing material may be discharged from the internal cavity 11 through the port(s) and the second communication hole 122. That is, when the injection port 16 is used as the port, or when a separate port is provided, the position of the second communication hole 122 is adjusted accordingly to ensure that the second communication hole 122 communicates with the injection port 16, or communicates with the one or more port(s) provided at any suitable position(s).

According to an embodiment of the present disclosure, referring to FIGS. 6 and 7, in a plane perpendicular to the axial direction of the end plate 10, the cross section of each of the internal cavities 11 may be circular, elliptical, triangular or polygonal (such as a rhombus, rectangle, square, regular pentagon, hexagon), or in any other suitable shape.

According to the embodiment of the present disclosure, referring to FIGS. 6 and 8, the cross section of each of the discharge holes 12 may be circular, elliptical, triangular or polygonal (such as rhombus, rectangle, square, regular pentagon, hexagon), or in any other suitable shape.

Figure 3:
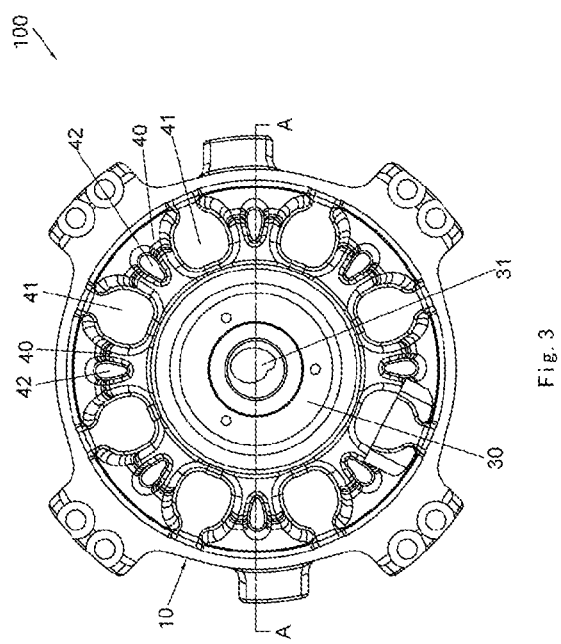
FIG. 3 is a schematic top view of the fixed scroll shown in FIG. 1.
Figure 4:
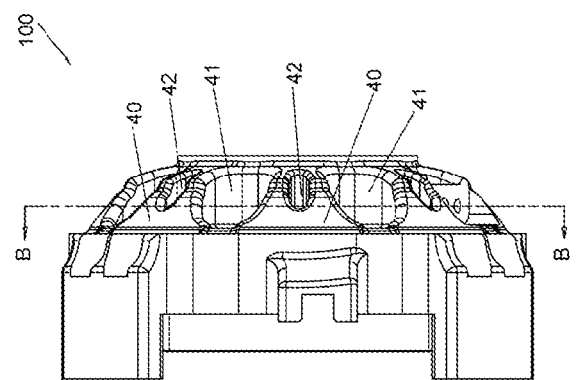
FIG. 4 is a schematic side view of the fixed scroll shown in FIG. 1.
Figure 5:
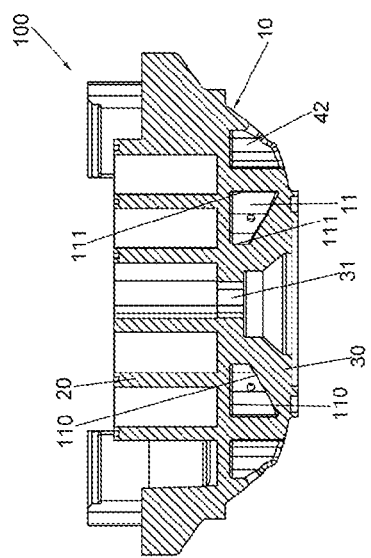
FIG. 5 is a schematic cross-sectional view of the fixed scroll taken along the line AA in FIG. 3.

According to the embodiment of the present disclosure, referring to FIGS. 1, 3, and 5, the end plate 10 has: a lug boss 30 arranged in the center of the other surface of the end plate 10; a plurality of reinforcing ribs 40 arranged at intervals in a circumferential direction of the end plate 30; a plurality of first recess portions 41 formed between the plurality of reinforcing ribs 40; and a plurality of second recess portions 42 respectively formed in the plurality of reinforcing ribs 40. It may be seen from FIG. 5 that the surface of the end plate 10 provided with the lug boss 30 is opposite to the other surface of the end plate 10 from which the fixed scroll wrap 20 protrudes, that is, the lug boss 30 and the fixed scroll 20 are respectively located on each side of the fixed scroll 100 in the axial direction thereof. A plurality of first recess portions 41 are arranged at intervals in the circumferential direction of the end plate 10 around the lug boss 30, and a plurality of second recess portions 42 are arranged at intervals in the circumferential direction of the end plate 10 around the lug boss 30. Referring to FIGS. 1, 3 and 5, at least some or all of the internal cavities 11 are formed in the lug boss 30. The fixed scroll 100 further includes a discharge port 31 of the compressor formed in the lug boss 30. The lug boss 30 is used to be connected to the discharge valve of the compressor.

According to the embodiment of the present disclosure, referring to FIGS. 1 and 6, the plurality of internal cavities 11 are respectively opposed to the plurality of reinforcing ribs 40 in the radial direction of the end plate 10. The plurality of first recess portions 41 are respectively opposed to the partition walls 50 between the two adjacent internal cavities 11 in the radial direction of the end plate 10.

The scroll compressor according to the embodiment of the present disclosure includes: the above-mentioned fixed scroll 100 and an orbiting scroll. The orbiting scroll has a moving scroll wrap, and the moving scroll wrap and the fixed scroll wrap cooperate to form a compression cavity for compressing a medium. In addition, the scroll compressor 100 may further include a casing and a bracket installed in the casing. The fixed scroll is fixed in the casing, and the orbiting scroll is rotatably supported on the bracket and is engaged with the fixed scroll. The scroll compressor further includes a driving mechanism, which is fixed at the lower end of the casing and connected with the orbiting scroll to drive the orbiting scroll to rotate.

An example of the 3D printing method of the fixed scroll of the scroll compressor according to the present disclosure is described below.

A 3D model of the fixed scroll is created in the CAD software, and the metal powder is heated and melted with the high-energy laser beam in the 3D printer, and then the molten metal powder is solidified. A complete static scroll disc is built layer by layer. The additive manufacturing process is specifically as follows.

1. Creating a 3D model of the fixed scroll in the computer with CAD software, converting it into a printable STL format, and sending it to the control computer of the 3D printer for slice layering.
2. Starting the 3D printer and applying a layer of hot fusible powder to a component building room.

3. Scanning each layer of powder with a high-energy laser beam. The laser beam acts on the powder to raise the temperature of the powder up to the melting point, and thus the powder particles are melted to form a solid cross-section of the fixed scroll, the intensity of the laser beam is adjusted to only melt the area limited by geometrical figure of the component, while the surrounding powder remains to be loose powder which serves as a natural support.
4. Lowing the shaping table by a layer thickness distance when the cross section of the fixed scroll is completely scanned, spreading a layer of new powder, and performing a next sintering; repeating such a scanning process until the final shaping of the part is completed.
5. Taking out the printed part, removing the powder around the part, and discharging the powder inside the fixed scroll through the designed discharge holes. Specifically, a device particularly designed for the structure of the discharge holes of the fixed scroll is used, and the device is inserted into the discharge holes of the fixed scroll. The device can be elastic and can be seamlessly fit with the discharge holes, thereby ensuring the metal powder inside the fixed scroll can be completely cleaned.

The additive manufacturing method can be selected from one of the following methods: a direct metal additive manufacturing method, a direct metal laser sintering method, a selective laser sintering (SLS), a selective laser melting (SLM) molding, an electron beam melting (EBM) molding, a wire arc additive manufacture (WAAM) technology, a laser cladding/laser engineered net shaping (LENS) technology, a nanoparticle jetting (NPJ), a multi-jet fusion (MJF), a stereolithography, a laminated solid manufacturing method, a melting position modeling method and combination(s) thereof.

When using the additive manufacturing method to produce the fixed scroll, the metal material may be selected from but not limited to one of the following materials: iron-based alloys, titanium and titanium-based alloys, nickel-based alloys, cobalt-chromium alloys, aluminum alloys, copper alloys and precious metals, etc.

By adopting the fixed scroll and the scroll compressor with the fixed scroll according to the embodiment of the present disclosure, for example, the weight of the scroll compressor can be reduced. For example, compared with the fixed scroll of a conventional scroll compressor, the weight of the fixed scroll according to the embodiment of the present disclosure can be reduced by about 30% while maintaining the same strength.

According to the embodiment of the present disclosure, the solid reinforcements on outside of the fixed scroll of the conventional scroll compressor is replaced with hollow reinforcement ribs, and the solid lug boss of the fixed scroll of the conventional scroll compressor is replaced with a lug boss with internal cavities, thereby reducing the weight of the fixed scroll of the scroll compressor, while maintaining the strength of the fixed scroll.

In addition, by providing the discharge holes 12, it is possible to discharge the metal powder during additive manufacturing of the fixed scroll.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A fixed scroll for scroll compressor, the fixed scroll comprising:
   an end plate;
   a fixed scroll wrap protruding from one surface of the end plate;
   a plurality of internal cavities formed in the end plate arranged around an axis of the end plate;
     discharge holes formed in the end plate and communicating the plurality of internal cavities with an environment external to the fixed scroll, which are configured to discharge material from the plurality of internal cavities during a manufacturing process; and
     a port formed in the end plate,
     wherein the plurality of internal cavities comprise two first internal cavities adjacent to the port and a plurality of second internal cavities arranged between the two first internal cavities in a circumferential direction, and
     wherein the discharge holes comprise:
   first communication holes which are located between and communicate the first internal cavity and the second internal cavity adjacent to each other, and which are located between and communicate two adjacent second internal cavities, and
   a second communication hole which communicates the two first internal cavities with the port.

2. The fixed scroll for scroll compressor according to claim 1, wherein:
   at least one internal cavity of the plurality of internal cavities comprises two inner walls facing each other in an axial direction of the end plate and two inner walls facing each other in a radial direction of the end plate.

3. The fixed scroll for scroll compressor according to claim 2, wherein:
   the end plate comprises a lug boss provided in a center of the other surface of the end plate, and at least some or all of the plurality of internal cavities are formed in the lug boss.

4. The fixed scroll for scroll compressor according to claim 1, wherein:
   the port comprises at least one of a suction port and an injection port of the compressor, or one or more dedicated ports.

5. The fixed scroll for scroll compressor according to claim 4, wherein:
   the end plate comprises a lug boss provided in a center of the other surface of the end plate, and at least some or all of the internal cavities are formed in the lug boss.

6. The fixed scroll for scroll compressor according to claim 1, wherein:
   each discharge hole has a cross section in a form of circular, elliptical or polygonal.

7. The fixed scroll for scroll compressor according to claim 1, wherein:
   the end plate comprises:
   a plurality of reinforcing ribs arranged at intervals in a circumferential direction of the end plate;
   a plurality of first recess portions formed between the plurality of reinforcing ribs; and
   a plurality of second recess portions respectively formed in the plurality of reinforcing ribs,
   wherein the plurality of internal cavities are respectively opposed to the plurality of the reinforcing ribs in a radial direction of the end plate, and
   the plurality of first recess portions are respectively opposed to a partition wall between two adjacent inner cavities in the radial direction of the end plate.

8. The fixed scroll for scroll compressor according to claim 1, wherein:
   the end plate comprises a lug boss provided in a center of the other surface of the end plate, and at least some or all of the internal cavities are formed in the lug boss.

9. The fixed scroll for scroll compressor according to claim 1, wherein:
   the fixed scroll is formed by 3D printing.

10. A scroll compressor, comprising:
    the fixed scroll according to claim 1.

11. The fixed scroll for scroll compressor according to claim 1, wherein:
    in a plane perpendicular to an axial direction of the end plate, each internal cavity of the plurality of internal cavities has a cross section in a form of circular, elliptical or polygonal.

* * * * *